US006564622B2

(12) United States Patent
Majkowski et al.

(10) Patent No.: US 6,564,622 B2
(45) Date of Patent: May 20, 2003

(54) METHOD OF DETERMINING SOAK-RELATED TIME INTERVALS OF AN INTERNAL COMBUSTION ENGINE

(75) Inventors: Stephen F. Majkowski, Rochester Hills, MI (US); Alton L. Schuessler, Flushing, MI (US); David Allen Dues, Howell, MI (US); Nicholas Colella, Dearborn, MI (US); Myron Harold Bell, Highland, MI (US)

(73) Assignee: Delphi Technologies, Inc., Troy, MI (US)

( * ) Notice: Subject to any disclaimer, the term of this patent is extended or adjusted under 35 U.S.C. 154(b) by 62 days.

(21) Appl. No.: 09/870,427

(22) Filed: May 30, 2001

(65) Prior Publication Data

US 2002/0002965 A1 Jan. 10, 2002

Related U.S. Application Data

(60) Provisional application No. 60/208,237, filed on May 31, 2000.

(51) Int. Cl.[7] ............................................ G01M 15/00

(52) U.S. Cl. ........................................ 73/116; 73/117.2

(58) Field of Search ................................ 73/116, 117.2; 60/274, 277; 123/491

(56) References Cited

U.S. PATENT DOCUMENTS 5,566,546 A * 10/1996 Rumpsa et al. ............... 60/274

* cited by examiner

*Primary Examiner*—Hezron Williams
*Assistant Examiner*—Takisha S Miller
(74) *Attorney, Agent, or Firm*—Vincent A. Cichosz

(57) ABSTRACT

An improved method of determining and preserving soak-related time intervals of an internal combustion engine resets a continuous timer at the end of each engine run period, and reads the value of the continuous timer at specified events during an ignition key cycle. The method measures and preserves the engine soak time preceding the current and previous ignition key cycle, and determines an extended soak time that includes intervals of engine operation that are too short to significantly affect the engine thermal and fuel vapor purge conditions. The determined soak-related times are then utilized by various engine control and/or diagnostic algorithms, such as a hot re-start fuel control algorithm.

6 Claims, 6 Drawing Sheets

| | | | | | | | | | | | | | | | | | | | | |
|---|---|---|---|---|---|---|---|---|---|---|---|---|---|---|---|---|---|---|---|---|
| TIME_A | X | X | X | 15 | 15 | 15 | 15 | 15 | 15 | 15 | 15 | 15 | 15 | 15 | 15 | 15 | 15 | 15 | 15 | 15 |
| TIME_B | X | X | X | 15 | 15 | 15 | 15 | 15 | 15 | 15 | 15 | 15 | 15 | 15 | 15 | 15 | 15 | 15 | 15 | 15 |
| TIME_C | 0 | 0 | 0 | 15 | 15 | 15 | 0 | 0 | 0 | 0 | 0 | 0 | 0 | 0 | 0 | 0 | 0 | 0 | 0 | 0 |
| TIME_D | X | X | X | X | X | X | X | X | X | X | X | X | X | X | 15 | 15 | 15 | 15 | 15 | 15 |
| TMR | 13 | 14 | 15 | 16 | 17 | 18 | 19 | 20 | 21 | 22 | 23 | 24 | 25 | 26 | 0 | 1 | 2 | 3 | 4 | 5 |

| | | | | | | | | | | | | | | | | | |
|---|---|---|---|---|---|---|---|---|---|---|---|---|---|---|---|---|---|
| TIME_A | X | X | X | 15 | 15 | 15 | 15 | 2 | 2 | 2 | 2 | 2 | 2 | 2 | 2 | 2 | 2 |
| TIME_B | X | X | X | 15 | 15 | 15 | 15 | 15 | 15 | 15 | 15 | 15 | 15 | 15 | 15 | 15 | 15 |
| TIME_C | 0 | 0 | 0 | 15 | 15 | 15 | 15 | 17 | 17 | 17 | 19 | 19 | 19 | 19 | 19 | 19 | 19 |
| TIME_D | X | X | X | X | X | X | X | X | X | X | X | X | X | X | X | 15 | 15 |
| TMR | 13 | 14 | 15 | 16 | 0 | 1 | 2 | 3 | 0 | 1 | 2 | 3 | 0 | 1 | 2 | 3 | 4 |

| | | | | | | | | | | | | | | | | | |
|---|---|---|---|---|---|---|---|---|---|---|---|---|---|---|---|---|---|
| TIME_A | X | X | X | 15 | 15 | 15 | 15 | 15 | 15 | 15 | 15 | 2 | 2 | 2 | 2 | 2 | 2 |
| TIME_B | X | X | X | 15 | 15 | 15 | 15 | 15 | 15 | 15 | 15 | 15 | 15 | 15 | 15 | 15 | 15 |
| TIME_C | 0 | 0 | 0 | 15 | 15 | 15 | 0 | 0 | 0 | 0 | 0 | 2 | 2 | 2 | 2 | 2 | 2 |
| TIME_D | X | X | X | X | X | X | X | X | X | X | X | X | X | X | 15 | 15 | 15 |
| TMR | 13 | 14 | 15 | 16 | 17 | 18 | 19 | 20 | 21 | 0 | 1 | 2 | 3 | 4 | 0 | 1 | 2 |

METHOD OF DETERMINING SOAK-RELATED TIME INTERVALS OF AN INTERNAL COMBUSTION ENGINE

This application claims the benefit of provisional application no. 60/208,237 filed on May 31, 2000.

TECHNICAL FIELD

The present invention is directed to the control of an internal combustion engine, and more particularly to a method of determining and preserving information of interest regarding the engine soak time.

BACKGROUND OF THE INVENTION

Many engine control algorithms, including fuel control algorithms and diagnostic algorithms, require a reasonably accurate assessment of the engine soak time to achieve optimal and reliable operation. While it is possible to simply measure the time since the last electrical power-down or key-off event, such information is insufficient for many purposes, and may actually misrepresent the engine soak time if one or more short engine cycles occur. Accordingly, many algorithms infer soak time by measuring changes in the engine coolant or ambient temperatures, even though such information is only indirectly related to soak time. See for example, the U.S. Pat. No. 5,566,546 to Rumpsa et al., which defines soak time as the time between when the engine is turned off and then restarted. Instead of measuring the soak time with a timer, Rumpsa et al. infer the soak time based on measured engine and air temperatures at engine turn-off and at engine re-starting. And even these techniques become useless if there is a failure of the temperature sensor. Accordingly, what is needed is a simple and cost-effective method of reliably and accurately determining and preserving time intervals that are related to the engine soak time, referred to herein as soak-related time intervals.

SUMMARY OF THE INVENTION

The present invention is directed to an improved method of determining and preserving soak-related time intervals of an internal combustion engine by resetting a continuous timer at the end of each engine run period, and reading the value of the continuous timer at specified events during an ignition key cycle. According to the preferred embodiment, the method measures and preserves the engine soak time preceding the current and previous ignition key cycles, and determines an extended soak time that includes intervals of engine operation that are too short to significantly affect the engine thermal and fuel vapor purge conditions. The determined soak-related times are then utilized by various engine control and/or diagnostic algorithms, such as a hot re-start fuel control algorithm.

DESCRIPTION OF THE PREFERRED EMBODIMENT

Figure 1:
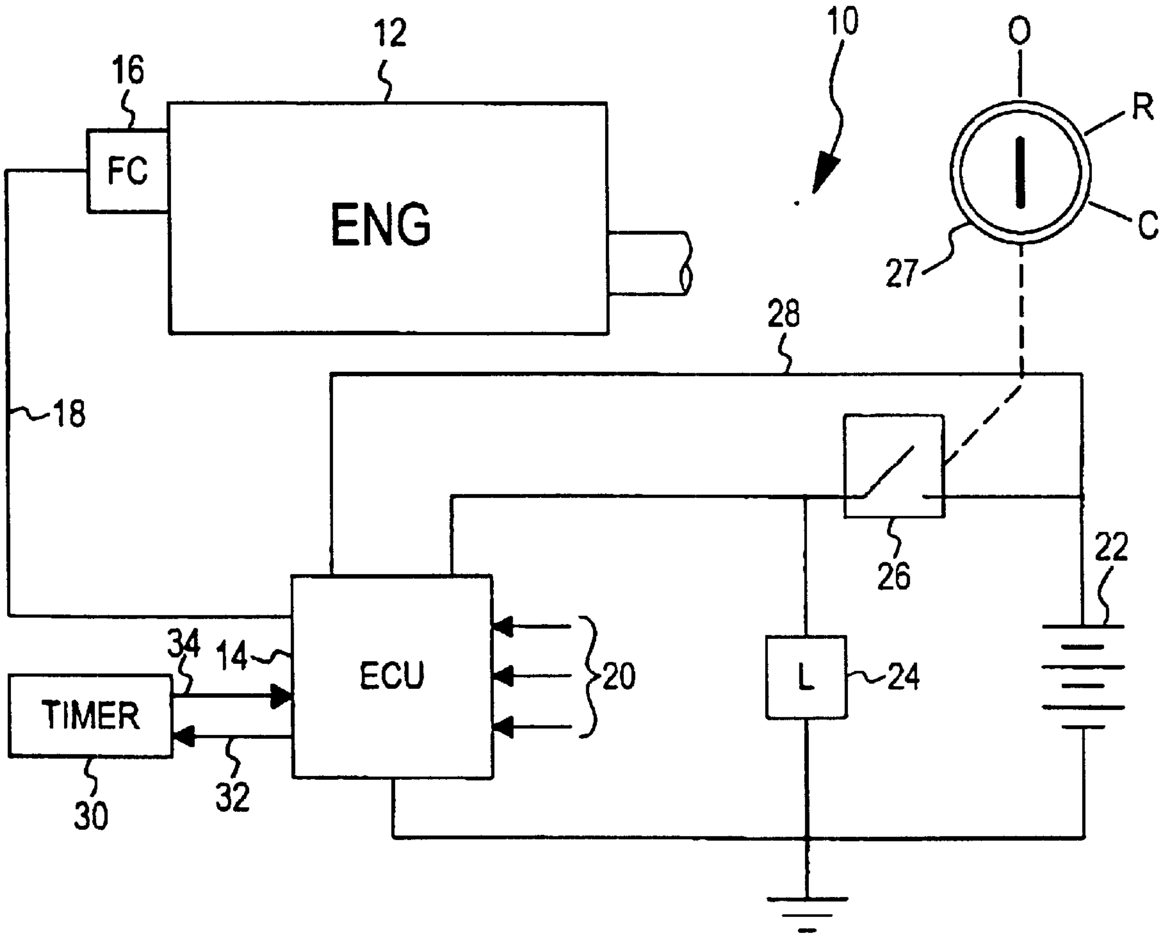
FIG. 1 is a system diagram of a motor vehicle, including an internal combustion engine, a driver manipulated ignition key, a continuous timer, and a microprocessor-based engine control unit programmed to carry out the method of this invention.

Referring to FIG. 1, the reference numeral 10 generally designates a motor vehicle control system including an internal combustion engine 12 and a microprocessor-based engine control unit (ECU) 14. The engine 12 is equipped with a fuel control (FC) mechanism 16, such as a conventional gasoline fuel injection system, and the ECU 14 controls the operation of fuel control mechanism 16 via line 18. Of course, the ECU 14 also performs a variety of other engine and vehicle related controls, such as spark timing control, engine idle air control, diagnostic controls, and so on. In carrying out such control functions, the ECU 14 receives a variety of inputs, generally designated by the reference numeral 20. The overall control system 10 also includes a vehicle storage battery 22 for supplying power to ECU 14 and other vehicle electrical loads (L) represented by the block 24 via an ignition switch 26 that is activated by a driver-manipulated key and lock cylinder 27 as shown. Additionally, the battery 22 or another voltage source is directly connected to ECU 14 as indicated by line 28, for purposes of temporarily extending the power supply to ECU 14 during a power-down interval after ignition switch 26 has opened. Finally, the system 10 includes a continuously operational hardware timer TMR 30 that can be reset by ECU 14 via line 32, and that provides a timer output TMR to ECU 14 on line 34. As explained below, the ECU 14 reads TMR in synchronism with certain engine and ignition events to determine engine soak-related times for use by various thermal-dependent control and diagnostic algorithms executed by ECU 14.

Figure 2:
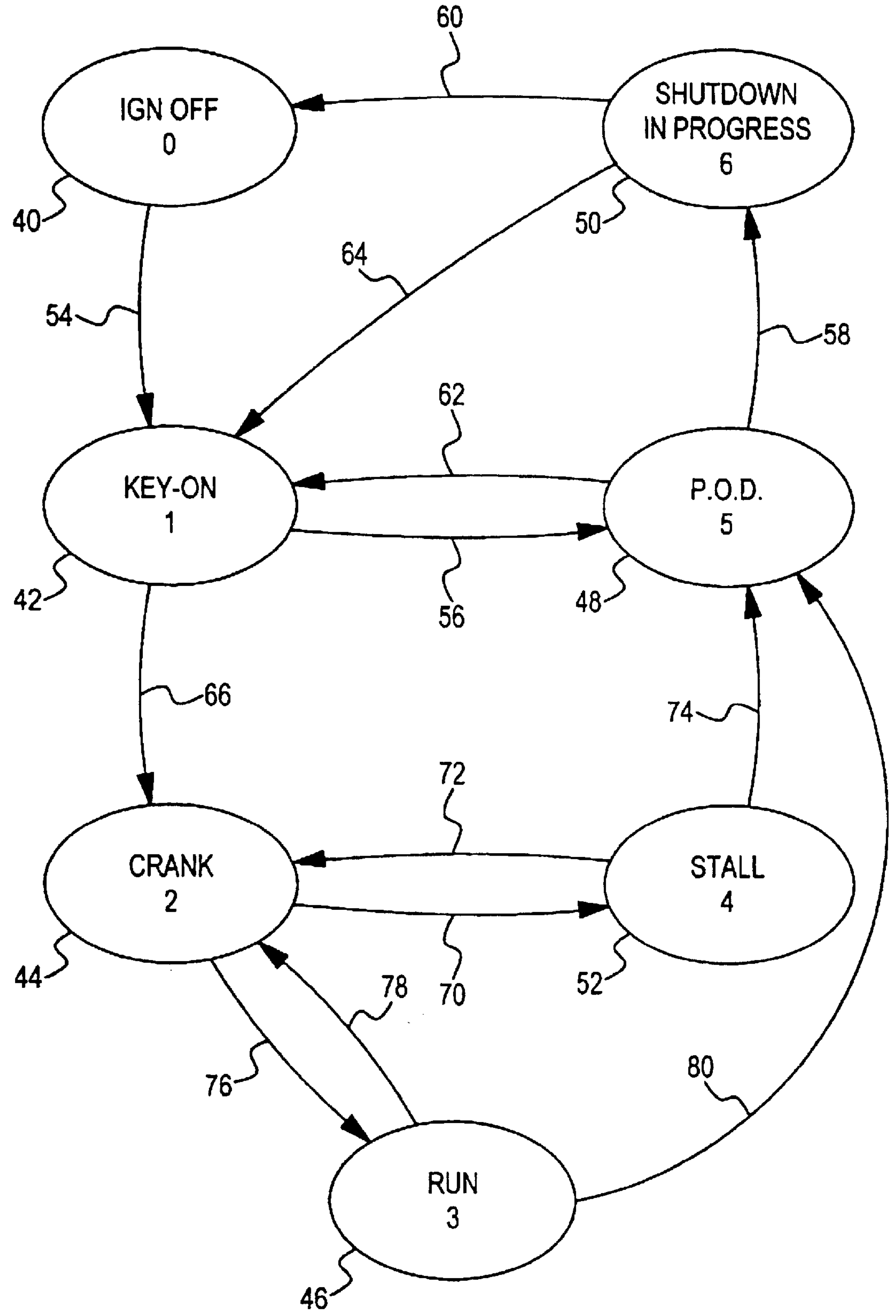
FIG. 2 is a state diagram illustrating the different possible states of the engine and electrical system of FIG. 1.

The state diagram of FIG. 2 depicts various states of the system 10 that normally occur during a period of vehicle operation. The states are represented by the bubbles 40, 42, 44, 46, 48, 50 and 52, and include an Ignition-Off State, a Key-On State, a Crank State, a Run State, a Power-Off-Delay (POD) State, a Shutdown-In-Progress State, and an Engine-Stall State. The system 10 transitions from the Ignition-Off State to the Key-On State as indicated by line 54 when the driver rotates the ignition lock cylinder 27 to the run (R) position, closing the ignition switch 26. At such point, the vehicle electrical system including ECU 14 is operational, but the engine 12 is not running. If the driver rotates the ignition lock cylinder 27 back to off (O) position, the ignition switch 26 opens, and the system 10 sequentially transitions to the Power-Off-Delay, Shutdown-In-Progress and Ignition-Off States as indicated by lines 56, 58 and 60. In the Power-Off-Delay and Shutdown-In-Progress States, the ECU 14 remains operational via power line 28; in the Power-Off-Delay State, various actuators and controlled devices are returned to a default state, and in the Shutdown-In-Progress State, selected control parameters are stored in the ECU's non-volatile memory for use in the next period of vehicle operation. As indicated, the system 10 can also transition from the Power-Off-Delay and Shutdown-In-Progress States to the Key-On State as indicated by lines 62 and 64 if the driver returns the ignition lock cylinder 27 to the run (R) position before the system transitions to the Ignition-Off State. When the driver rotates the lock cylinder 27 to the crank (C) position, the system 10 transitions to the Crank State as indicated by line 66, which is defined in terms of engine speed. If the engine 12 fails to start, the control transitions to the Stall State, as indicated by the line 70. If the driver returns the lock cylinder 27 to the crank (C) position, the system 10 returns to the Crank State, as indicated by line 72, whereas if the driver returns the lock cylinder to the off (O) position, the system 10 successively transitions from the Stall State to the Power-Off-Delay, Shutdown-In-Progress and Ignition-Off States, as indicated by the lines 74, 58 and 60. If the engine 12 starts (as defined by a minimum engine speed for at least a minimum time interval), the system 10 transitions to the Run State as indicated by line 76. If the engine 12 is in the Run State but stalls, the system 10 successively transitions to the Crank and Stall States, as indicated by lines 78 and 70. And finally, if the engine 12 is running and the driver rotates the lock cylinder 27 to the off (O) position, the system 10 successively transitions from the Run State to the Power-Off-Delay, Shutdown-In-Progress and Ignition-Off States, as indicated by the lines 80, 58 and 60.

From the above description, it will be apparent that the system 10 may remain in various states for indefinite periods of time, and that simply using opening and closing of the ignition switch 26 to measure engine soak-related time periods is subject to significant error. The present invention overcomes this difficulty with a method carried out by the ECU 14 in which the continuous timer 30 is reset to zero at transitions from the Run State, and read at various state transition events to accurately determine engine soak-related times.

Figure 3:
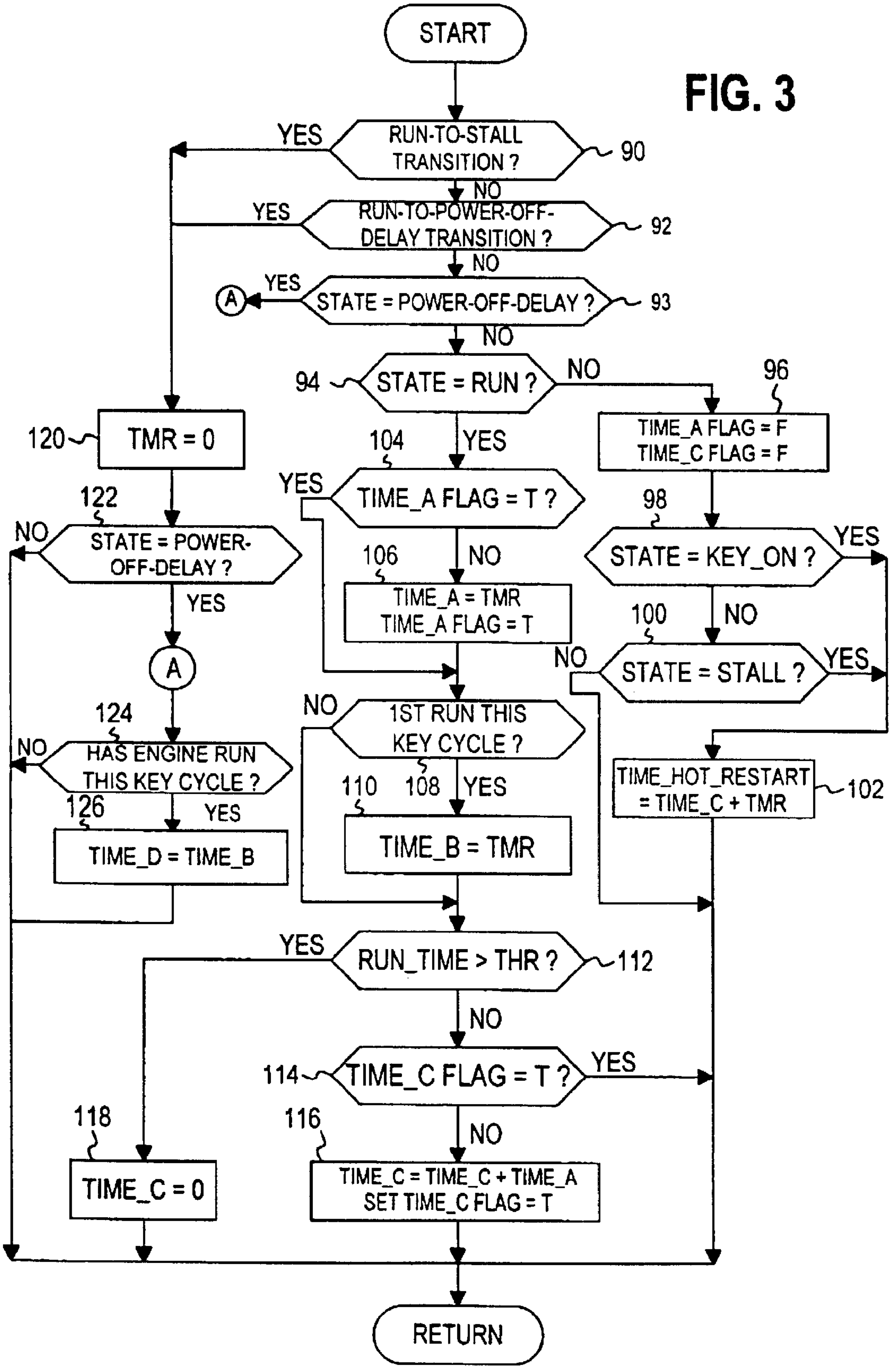
FIG. 3 is a flow diagram representative of a software routine executed by the control unit of FIG. 1 for carrying out the method of the present invention.

The flow diagram of FIG. 3 represents a software routine periodically executed by the ECU 14 during the Key-On, Crank, Run, Stall and Power-Off-Delay States for measuring and preserving various soak-related time intervals according to this invention. The identified time intervals are designated as TIME__A, TIME__B, TIME__C and TIME__D. Various FLAGS used in the routine are assumed to be initialized to the False State. Other software routines executed by ECU 14 identify the current state of system 10, and carry out control and diagnostic algorithms (such as fuel control 16) that utilize the engine soak related times developed by the routine of FIG. 3.

Referring to FIG. 3, the blocks 90, 92, 93 and 94 are first executed on entering the routine to detect transitions from the Run State to the Crank State or the Power-Off-Delay State, and to determine if the Power-Off-Delay or Run States are active. Initially, the blocks 90, 92, 93 and 94 will be answered in the negative, and blocks 96, 98, 100 and 102 are executed to set the TIME__A FLAG and the TIME__C FLAG to False and to update a hot restart time (TIME__HOT__RESTART) if the Key-On or Stall States are active. The hot restart time represents an extended engine soak time in the event of one or more short engine run periods, as explained below. Once the engine 12 is started and the Run State becomes active, block 94 is answered in the affirmative, and block 104 is executed to determine if the TIME__A FLAG is True. Due to the operation of block 96, block 104 is initially answered in the negative, and block 106 sets TIME__A equal to the timer value TMR and sets the TIME__A FLAG to True. As will be seen below, TIME__A represents the engine soak time prior to the current engine run period. Then block 108 determines if the current engine run period is the first run period in the current key cycle. If so, the block 110 is executed to set TIME__B equal to the timer value TMR. Thus, TIME__B represents the engine soak time prior to the current key cycle. Next, the block 112 determines if the engine run time RUN__TIME (which may be computed according to the difference between TIME__A and TMR, or otherwise accumulated once the Run State is activated) is greater than a reference time THR, such as three minutes. Initially, RUN__TIME is less than THR, and the blocks 114 and 116 increase the value of TIME__C by TIME__A, and set the TIME__C FLAG to True. Since flag TIME__C is initialized to the False state by block 96, and block 116 sets it to the True state, block 116 is only executed to update TIME__C at the beginning of each engine Run State. However, if RUN__TIME exceeds THR, the block 118 resets TIME__C to zero, indicating that an engine run time of THR or longer has occurred. Thus, TIME__C represents an extended engine soak time that includes intervals of engine operation that are too short to significantly affect the thermal condition of engine 12. When blocks 90 or 92 detect a transition from the Run State to the Crank State or the Power-Off-Delay State, the block 20 resets the timer 30 to zero, and the blocks 122, 124 and 126 set TIME__D equal to TIME__B if the Power-Off-Delay State is active and the Run State has been active during the current key cycle. The time TIME__D is also set equal to TIME__B if the Power-Off-Delay State is active, so long as the engine 10 has run during the current key cycle; see blocks 93, 124 and 126. Thus, TIME__D represents the initial engine soak time for the previous key cycle.

Figure 4:
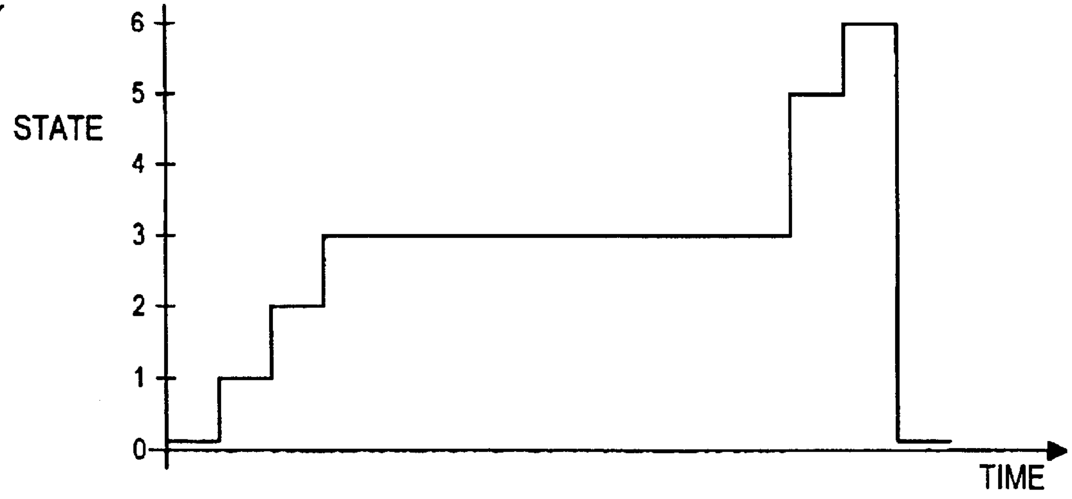
FIG. 4 is a timing diagram illustrating time interval values developed in accordance with the flow diagram of FIG. 3 for a normal engine run cycle.
Figure 5:
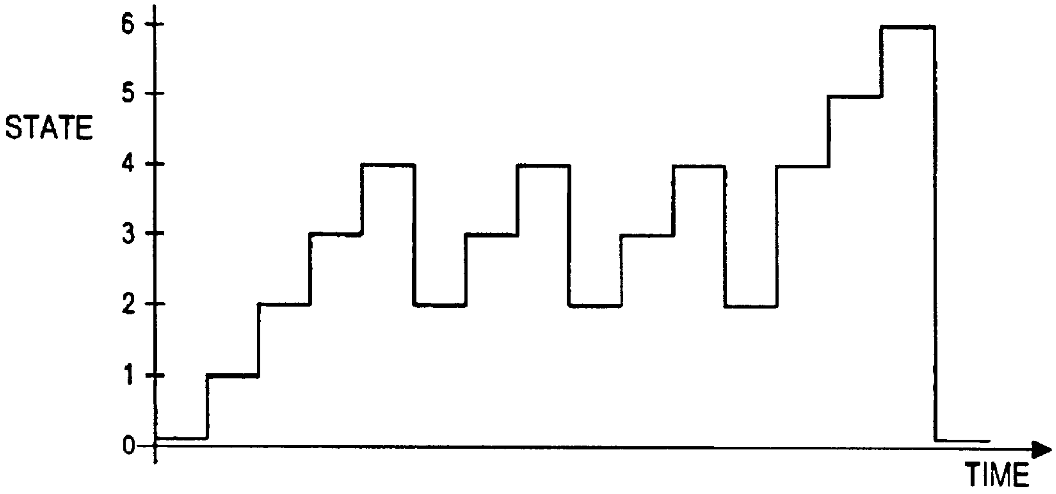
FIG. 5 is a timing diagram illustrating time interval values developed in accordance with the flow diagram of FIG. 3 for a first series of engine run cycles.
Figure 6:
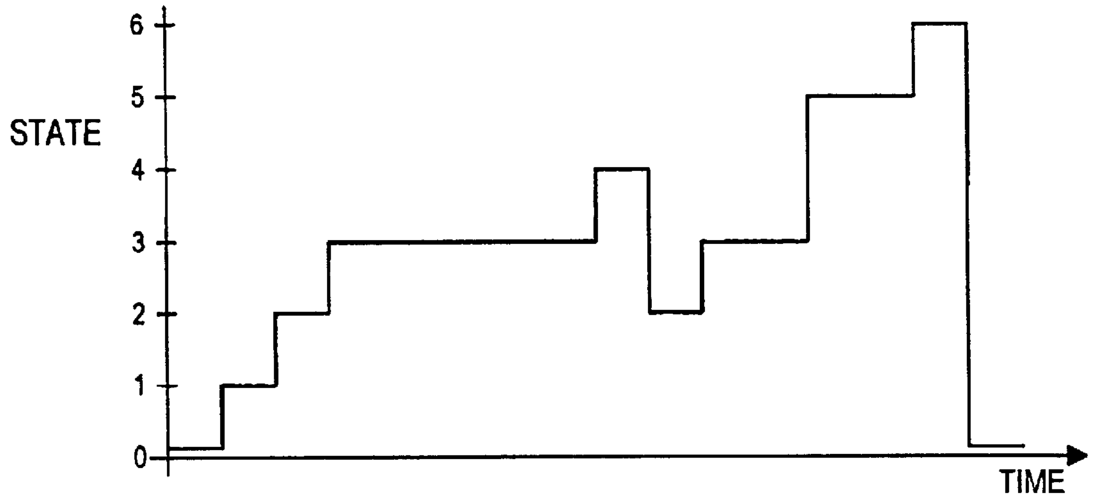
FIG. 6 is a timing diagram illustrating time interval values developed in accordance with the flow diagram of FIG. 3 for a second series of engine run cycles.

The operation and significance of the various soak-related times described above are illustrated in the timing diagrams of FIGS. 4, 5 and 6. Each diagram depicts the system state (States 0–6), the time values TIME__A, TIME__B, TIME__C, TIME__D, and the timer value TMR. An arbitrary timer value TMR has been chosen for each example, and the letter X signifies an initial unknown time value. FIG. 5 illustrates a normal engine run cycle, while FIGS. 6 and 7 illustrate two different crank-run-stall scenarios.

Referring to FIG. 4, the state activation chart shows that the system 10 successively transitions from the Ignition-Off State (0) to the Key-On State (1), to the Crank State (2), and to the Run State (3). After an extended period (i.e., greater than the reference time THR) in the Run State, the system 10 successively transitions to the Power-Off-Delay State (5), the Shutdown-In-Progress State (6), and the Ignition-Off State (0). Initially, the timer value TMR is 13, and TIME__C has an initial value of zero, signifying that the previous engine run period was longer than the reference time THR. Accordingly, TIME__HOT__RESTART is set equal to 13 when block 102 of FIG. 3 is executed at the transition to the Key-On State. As indicated above, TIME__HOT__RESTART may be used upon activation of the Crank State as part of a hot re-start fuel control to accurately control fuel delivery for reliably starting engine 12. At the transition to the Run State, TIME__A, TIME__B and TIME__C are set equal to the current timer value TMR of 15. However, when RUN__TIME exceeds THR, TIME__C is reset to zero as shown, indicating that the engine 12 has been running long enough to purge any vapor in the engine fuel delivery system and to significantly affect the engine thermal condition. At the transition to the Power-Off-Delay State, the blocks 120 and 126 of FIG. 3 are executed to reset the timer value TMR to zero and to set TIME__D equal to TIME__B as shown. Thus, TIME__B preserves the engine soak time from the previous key cycle, and the fact that TIME__A is equal to TIME__B means that there was only one engine run period in the previous key cycle. Also, TIME__C indicates that the previous engine run period was longer than reference time THR, and TIME__D preserves the current value of TIME__B during the next engine run period.

Referring to FIG. 5, the state activation chart shows that the system 10 successively transitions from the Ignition-Off State (0) to the Key-On State (1), and then repetitively transitions from the Key-On State (1) to the Crank State (2), to the Run State (3), to the Stall State (4), and back to the Crank State (2). Thereafter, the system 10 successively transitions from the Crank State (2) to the Stall State (4), the Power-Off-Delay State (5), the Shutdown-In-Progress State (6), and the Ignition-Off State (0). As in the example of FIG. 4, the timer 30 has an initial value of 13, and TIME_C has an initial value of zero, signifying that the previous engine run period was longer than the reference time THR. Accordingly, TIME_HOT_RESTART is set equal to 13 when block 102 of FIG. 3 is executed at the first transition to the Key-On State. At the first transition to the Run State, TIME_A, TIME_B and TIME_C are set equal to the current timer value TMR of 15. However, the engine 12 stalls before RUN_TIME reaches THR, and the timer 30 is reset to zero at the first Run-to-Stall transition. Also, TIME_HOT_RESTART is updated as the sum of TIME_C and TMR (15+0) so that at the ensuing transition to the Crank State, TIME_HOT_RESTART has a value of 15. At the next transition to the Run State, TIME_A is set equal to the current timer value TMR of 2, and TIME_C increases from 15 to 17. However, TIME_B retains its current value since block 108 is answered in the negative. Again, the engine 12 stalls before RUN_TIME reaches THR, and the timer 30 is reset to zero at the second Run-to-Stall transition. Also, TIME_HOT_RESTART is updated as the sum of TIME_C and TMR (17+0) so that at the ensuing transition to the Crank State, TIME_HOT_RESTART has a value of 17. At the next transition to the Run State, TIME_A is set equal to the current timer value TMR of 2, and TIME_C increases from 17 to 19. Again, TIME_B retains its current value since block 108 is answered in the negative. Once again, the engine 12 stalls before RUN_TIME reaches THR, and the timer 30 is reset to zero at the third Run-to-Stall transition. Also, TIME_HOT_RESTART is updated as the sum of TIME_C and TMR (19+0) so that at the ensuing transition to the Crank State, TIME_HOT_RESTART has a value of 19. At this point, the engine fails to start, and the engine transitions from the Crank State to the Stall State. Thus, the timer 30 is not reset, and the values of TIME_A, TIME_B and TIME_C are retained. When the system 10 transitions to the Power-Off-Delay State, TIME_D is set equal to TIME_B as shown. Thus, TIME_B preserves the engine soak time preceding the previous key cycle, and TIME_A preserves the soak time preceding the previous engine run period. The fact that TIME_A differs from TIME_B means that there was more than one engine run period in the previous key cycle. Also, TIME_C indicates that the previous engine run period was shorter than reference time THR, and in the next key cycle, TIME_HOT_RESTART will be updated according to the sum of TIME_C and the current value TMR of timer 30. Finally, TIME_D preserves the engine soak time preceding the previous key cycle (i.e., TIME_B) during the next engine run period.

Referring to FIG. 6, the state activation chart shows that the system 10 successively transitions from the Ignition-Off State (0) to the Key-On State (1), to the Crank State (2), and to the Run State (3). After an extended period (i.e., greater that the reference time THR) in the Run State, the system 10 successively transitions from the Run State (3) to the Stall State (4), to the Crank State (2), to the Run State (3), to the Power-Off-Delay State (5), to the Shutdown-In-Progress State (6), and to the Ignition-Off State (0). As in the examples of FIGS. 4 and 5, the timer 30 has an initial value of 13, and TIME_C has an initial value of zero, signifying that the previous engine run period was longer than the reference time THR. Accordingly, TIME_HOT_RESTART is set equal to 13 when block 102 of FIG. 3 is executed at the transition to the Key-On State. At the first transition to the Run State, TIME_A, TIME_B and TIME_C are set equal to the current timer value TMR of 15. However, when RUN TIME exceeds THR, TIME_C is reset to zero as shown, indicating that the engine 12 has been running long enough to purge any vapor in the engine fuel delivery system and to significantly affect the engine thermal condition. When the engine stalls, the timer 30 is reset to zero, and TIME_HOT_RESTART is updated as the sum of TIME_C and TMR (0+0) so that at the ensuing transition to the Crank State, TIME_HOT_RESTART has a value of 0. At the next transition to the Run State, TIME_A is set equal to the current timer value TMR of 2, and TIME_C increases from 0 to 2. When the system 10 transitions from the Run State to the Power-Off-Delay State, the timer 30 is reset to zero, and TIME_D is set equal to TIME_B as shown. Thus, TIME_D preserves the initial soak time for the current key cycle for use during the next key cycle, and TIME_A preserves the soak time preceding the previous engine run period. The fact that TIME_A differs from TIME_B means that there was more than one engine run period in the previous key cycle. Also, TIME_C indicates that the previous engine run period was shorter than reference time THR, and in the next key cycle, TIME_HOT_RESTART will be updated according to the sum of TIME_C and the current value TMR of timer 30. Finally, TIME_D preserves the initial soak time for the current key cycle for use during the next key cycle.

In summary, the method of the present invention determines and preserves soak-related time intervals of an internal combustion engine by resetting a continuous timer at the end of each engine run period, and reading the value of the continuous timer at specified events during an ignition key cycle. The times TIME_B and TIME_D are used to measure and preserve the initial soak time for the current key cycle for use during the next key cycle, and the times TIME_A and TIME_C are used to determine an extended soak time that includes intervals of engine operation that are too short to significantly affect the engine thermal and fuel vapor purge conditions. While the present invention has been described in reference to the illustrated embodiments, it is expected that various modification in addition to those mentioned above will occur to those skilled in the art. For example, the soak-related time intervals may be recorded in different resolutions (seconds vs. minutes, for example) depending on the requirements of the control or diagnostic algorithm that utilizes the recorded time intervals. Also, the continuous timer 30 may be utilized for other purposes in addition to measuring soak-related time intervals, such as for time-stamping certain control or diagnostic events. Thus, it will be understood that methods incorporating these and other modifications may fall within the scope of this invention, which is defined by the appended claims.

What is claimed is:

1. A method of determining soak-related time intervals of a motor vehicle control system including an internal combustion engine, the method comprising the steps of:

defining control system states, including an engine run state, an engine stall state and a power-off-delay state;

continuously measuring a time interval beginning at a transition from the engine run state to the engine stall or power-off-delay states;

capturing the measured time interval at every transition to the run state;

determining an engine run time interval based on an elapsed time in said run state; and determining a soak-related time interval based on the captured time interval and the determined engine run time.

2. The method of claim 1, including the step of:

comparing the determined engine run time to a reference time; and determining an extended soak-related time interval if the system transitions from the run state to the stall or power-off-delay states when the determined engine run time is less than the reference time.

3. The method of claim 2, wherein the step of determining an extended soak-related time interval includes the step of:

accumulating the captured time intervals for successive periods of operation in the run state for which the determined engine run time is less than the reference time.

4. The method of claim 3, including the steps of:

re-capturing the measured time interval; and determining the extended soak-related time interval based on a sum of the accumulated time intervals and the re-captured time interval.

5. The method of claim 3, including the step of:

resetting the accumulated time intervals to zero when the determined engine run time exceeds the reference time.

6. The method of claim 1, including the step of:

capturing the measured time interval at a first transition to the run state during an uninterrupted activation of said control system, and saving such time interval as a previous soak time interval when the control system transitions from the run state to the power-off-delay state.

* * * * *